Oct. 11, 1938.  H. A. TOMKINS ET AL  2,132,811
SAFETY CONTROL SYSTEM
Filed June 19, 1936  2 Sheets-Sheet 1
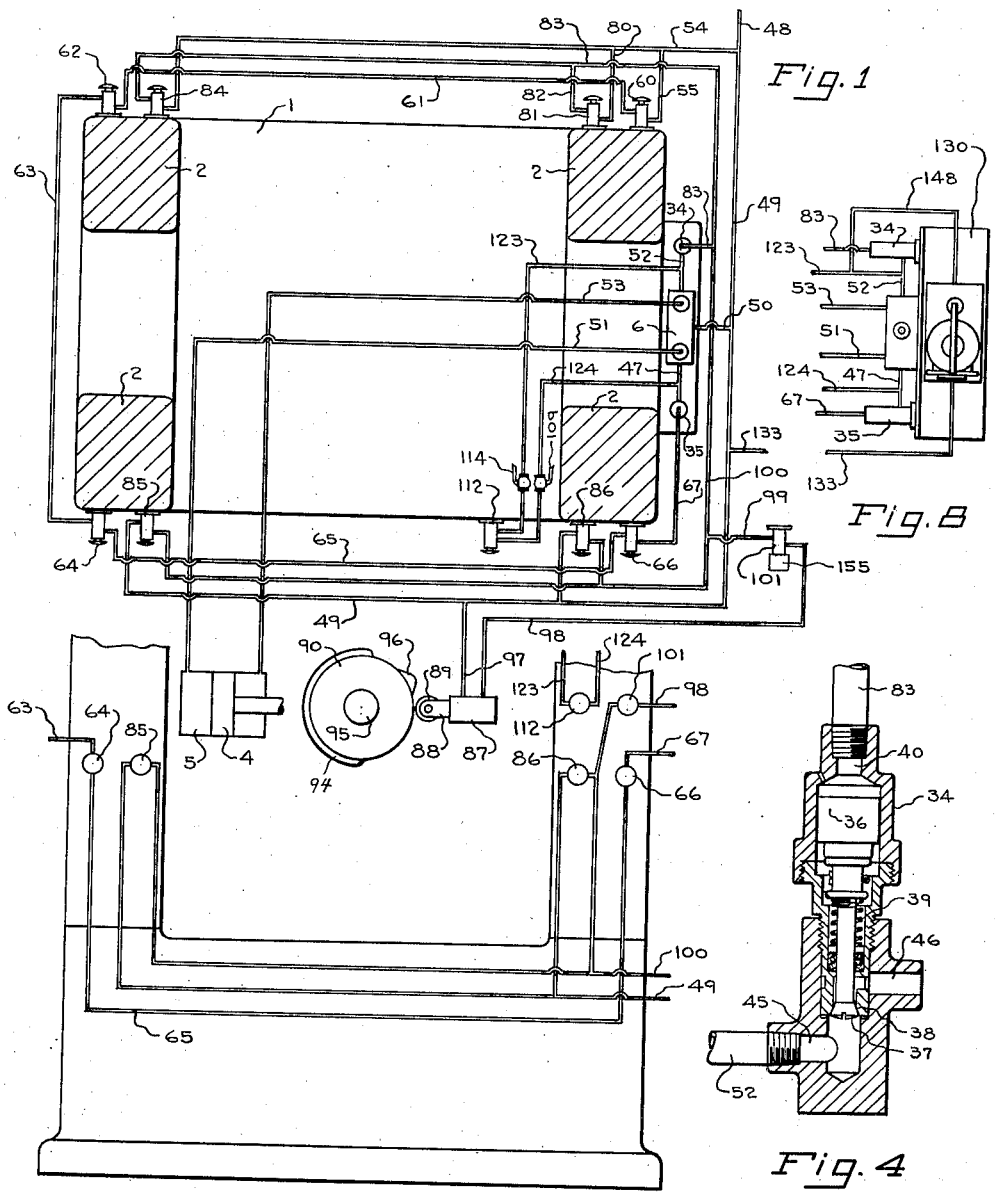
Inventors
HAROLD A. TOMKINS AND
LOYD A. WARD
By Beaman & Langford
Attorney Oct. 11, 1938.  H. A. TOMKINS ET AL  2,132,811
SAFETY CONTROL SYSTEM
Filed June 19, 1936  2 Sheets-Sheet 2

Inventors
HAROLD A. TOMKINS AND
LOYD A. WARD
By Beaman & Langford
Attorney

Patented Oct. 11, 1938

2,132,811

UNITED STATES PATENT OFFICE 2,132,811

SAFETY CONTROL SYSTEM

Harold A. Tomkins and Loyd A. Ward, Jackson, Mich., assignors to The Tomkins-Johnson Company, Jackson, Mich., a corporation of Michigan Application June 19, 1936, Serial No. 86,106

9 Claims. (Cl. 192—131)

This invention relates to remote control systems for machines and more particularly to such systems designed to assure safety and protection of the machine operatives.

In operating certain types of fabricating machines such as stamping presses where one or more operatives feed and remove the work there is always the danger that the clutch for operating the machine will be engaged before the hands of the operative are removed from the path of moving machine parts. Numerous safety devices have been devised, but for one reason or another they have not been wholly satisfactory.

An object of the present invention is to provide a remote safety control system for machines requiring the absence of both hands of the operative or operatives from the path of moving parts.

Another object of the invention is to provide such a system operated by a plurality of spring or push button valves which control the flow of air.

Still another object of the invention is to provide a control system for machines requiring both hands of the operative or operatives to initiate operation of the machine but only one hand to stop it.

Figure 10:
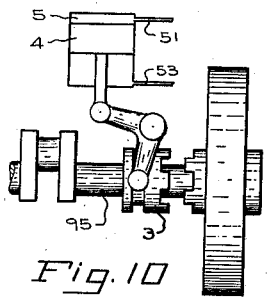
Figure 3:
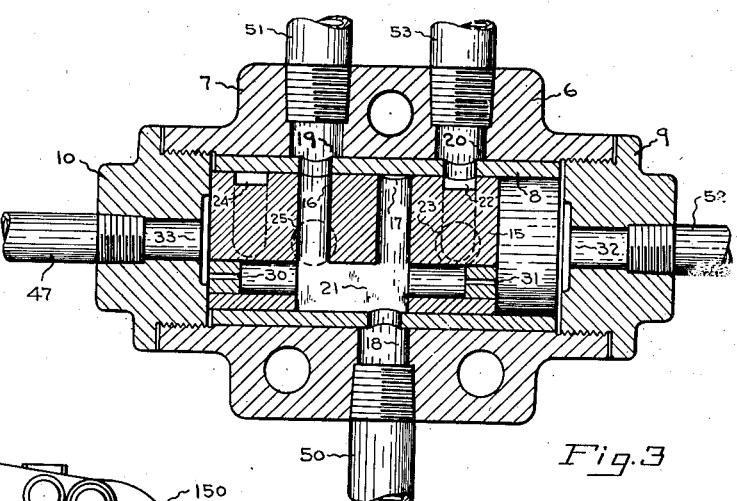
Figure 9:
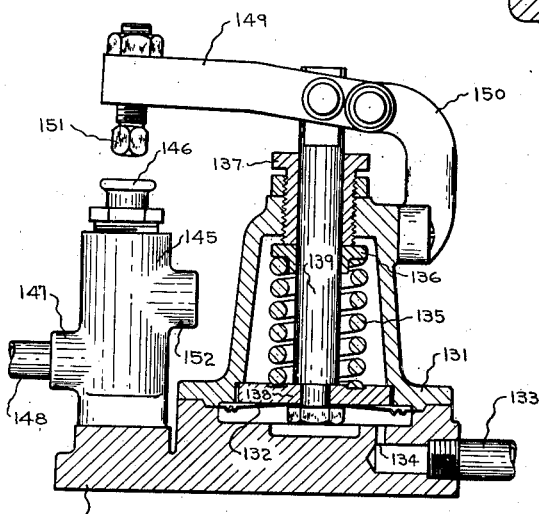
Figure 5:
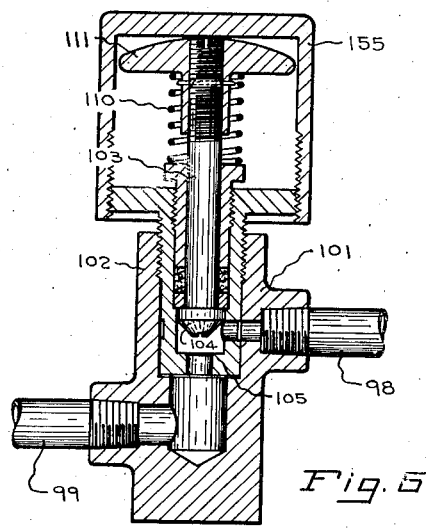
Figure 7:
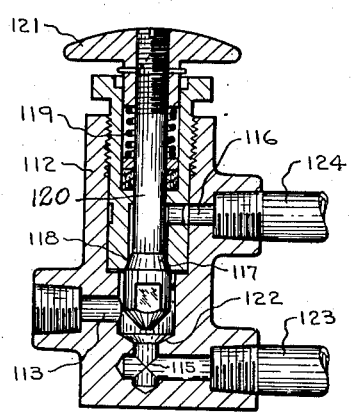

These and other objects will be apparent from the specification when taken with the accompanying drawings in which Fig. 1 is a diagrammatic illustration of the invention as applied to a stamping press, Fig. 2 is a partial side view of a press illustrating a suggested location for valves and air conduits on one side of the press, Fig. 3 is a vertical section through the distributing valve, Fig. 4 is a vertical section through the piston exhausting valve, Fig. 5 is a vertical section through the push button starting valve, Fig. 6 is a vertical section through the hand open push button valve, Fig. 7 is a vertical section through the inching valve, Fig. 8 is a diagrammatic illustration of the low pressure stop valve together with the distributing valve, Fig. 9 is a partial vertical section through the low pressure stop valve, and Fig. 10 is a diagrammatic illustration of the clutch and clutch releasing and engaging piston.

For the purpose of illustration the invention is disclosed as applied to a stamping press. It is to be understood, however, that it may be applied to a wide variety of machines. Referring particularly to Fig. 1 the reference character 1 indicates the base of a stamping press having corner posts 2. The press is of the character requiring four operators, two on one side for feeding the material to be operated on and two on the other side for removing the material after it has been operated on. Briefly described the press is provided with four button valves, two on each side of the press, all four of which must be actuated simultaneously to start the press, and four additional button valves, two located on each side of the press, any one of which may be actuated to stop the press. A cam actuated valve is provided to stop the press at the end of a complete cycle of operation. Other button valves are provided to perform other special functions.

Operation of the press is started and stopped by the engaging and disengaging of the clutch 2. See Fig. 10. The clutch 3 is engaged and disengaged by a piston 4 moving in a cylinder 5. See Figs. 1 and 10. Compressed air for actuating the piston 4 is selectively directed to one end or the other of the cylinder 5 by the slide distributing valve 6 shown diagrammatically in Fig. 1 and in detail in Fig. 3. The slide distributing valve is patterned after the slide distributing valve disclosed in the copending application of Oscar G. Tweddell, Serial No. 733,617, filed July 3, 1934 and comprises a cylindrically bored body 7 having a liner 8 and end plugs 9 and 10. A sliding distributing piston 15 is disposed within the body 7 and is provided with air distributing ports 16 and 17. Compressed air is admitted to the body 7 through the inlet port 18 and is discharged therefrom by either the outlet port 19 or 20 depending on the end of the cylinder 5 to which the air is to be directed. In the position shown compressed air from the inlet port 18 passes to the chamber 21 and through the distributing port 16 to the outlet port 19. At the same time exhaust air from the end of the cylinder 5 which is being exhausted passes through the port 20 and the peripheral slot 22 in the piston 15, to the exhaust port 23 in the back side of the body 7. When the piston 15 is moved to the opposite end of the body 7 compressed air from the inlet port 18 passes to the chamber 21 and through the distributing port 17 to the outlet port 20. At the same time air is exhausted from the now exhausting side of the cylinder 5 through the port 17 and the peripheral slot 24 in the piston 15 to the exhaust port 25 in the back side of the body 7.

The piston 15 is provided at each end with leakage ports 30 and 31 providing communication between the chamber 21 and the ends of the body 7. To move the piston 15 from its position shown to the right end of the body 7 air is exhausted from the right end of the body 7 and through the port 32. As each end of the body 7 is in communication with the chamber 21 through the leakage ports 30 and 31 the pressure in each end of the body 7 is equal to the pressure of the pressure in the chamber 21. Therefore as soon as the air is exhausted from the free end of the body 7 the compressed air at the opposite end of the body 7 will expand forcing the piston 15 to the free end of the cylinder. It will be clear that by exhausting through the port 33 the piston 15 may be returned to its position as shown in Fig. 3.

The exhausting of air from either end of the distributing valve 6 is controlled by piston exhaust valves 34 and 35 which are identical in construction. Referring particularly to Fig. 4 wherein the exhaust valve 34 is disclosed, the piston exhaust valve 34 comprises a body in which is disposed a piston 36 to which is connected a valve 37 held against a seat 38 by a spring 39. The valve 37 is removed away from its seat 38 by admitting air to the port 40 which drives the piston 36 downwardly against the action of the spring 39. The air to be exhausted, and in the present case from one end of the distributing valve 6, is connected to the inlet port 45. Then when the valve 37 is moved from its seat 38 the air to be exhausted passes by the seat 38 into the outlet port 46 which leads to the atmosphere.

In operation the machine is started by exhausting the lower or starting end of the distributing valve 6 as disclosed in Fig. 1 through the conduit 47 and the piston valve 35 to the atmosphere. Compressed air from a source of supply is conducted by conduits 48, 49 and 50 to the inlet port 18 as disclosed in Fig. 3. It then passes through the chamber 21, the port 16, the outlet port 19 and the conduit 51 to the left end of the cylinder 5 as shown in Fig. 1, to drive the piston 4 forwardly to engage the clutch 3. When it is desired to stop the machine the stopping or top end as viewed in Fig. 1 of the distributing valve 6 is exhausted through the conduit 52 and the piston valve 34 to the atmosphere. The piston 15 of the distributing valve 6 is then in the right end of the valve 6 as viewed in Fig. 3 and compressed air from the source through the conduits 48, 49 and 50 passes to the inlet valve 18 through the port 17, the outlet port 20 and the conduit 53 to the right end of the cylinder 5 and drives the piston 4 back to release the clutch 3. During the time the piston 4 is moving from one end of the cylinder 5 to the other the air from the exhausting end of the cylinder 5 is being exhausted as heretofore explained.

In order to actuate the piston valve 35 to start the machine, compressed air is conducted from the source through the conduits 48, 54 and 55 through the hand starting valve 60 to the conduit 61, through the hand starting valve 62 to the conduit 63, through the hand starting valve 64 to the conduit 65, through the hand starting valve 66 to the conduit 67 which connects with the port 40 of the piston valve 35. It will be observed that the hand starting valves 60, 62, 64 and 66 are in series with the source of compressed air and the piston valve 35 making it necessary that all four hand starting valves be pressed simultaneously in order to permit the passage of compressed air to the port 40 to act on the piston 36 to move the valve 37 from its seat 38 and to permit air to exhaust from the distributing valve 6 through the conduit 47 and the piston valve 35 to the atmosphere.

The hand starting valves 60, 62, 64 and 66 are disclosed more fully in Fig. 5. Each valve has a body 68 in which is disposed a valve 69 held against a seat 70 by a spring 71. The upper end of the valve stem 72 is provided with a rounded button 73 for manual engagement. Within the body 68 is an inlet port 74 and an outlet port 75. Communication between the ports 74 and 75 is interrupted by the valve 69. It will thus be clear that as the button 73 is depressed against the action of the spring 71 the valve 69 is moved from its seat 70 and compressed air may pass from the inlet port 74 to the outlet port 75.

In order to actuate the piston valve 34 to stop the machine compressed air is conducted from the source through the conduits 48, 54 and 80 to the hand stopping valve 81. The hand stopping valve 81 is the same as the hand starting valves 60, 62, 64 and 66 so that as its button is pushed the compressed air passes through to the conduits 82 and 83 to the piston valve 34 to act on the piston 36 and move the valve 37 from its seat 38 and permit air to exhaust from the distributing valve 6 through the conduit 52 and the piston valve 34 to the atmosphere. The press is also provided with hand stopping valves 84, 85, and 86 all like the hand stopping valve 81, which are connected in parallel between the conduit 48 from the source of supply of compressed air and the piston valve 34 together with the hand stopping valve 81 so that the pushing of any one of them will admit compressed air from the source to the port 40 of the piston valve 34 to exhaust distributing valve 6 through the conduit 52 to stop the press.

It should be observed that the hand starting valves 60 and 62 are spaced and on one side of the press and the hand starting valves 64 and 66 are spaced and on the other side of the press. The spacing of these valves on each side of the press is such as to require the operatives, in order to push them to trip the press, to be completely removed from danger being sufficiently removed from the operative portions of the press that they can not place their hands or arms in danger. With this arrangement and remembering that all four hand starting valves must be simultaneously actuated before the press will start, it will be clear that it will be impossible for any of the four operatives required in the operating of the present machine to have his hands or arms injured by the machine. It will further be clear from the disclosure thus far that for a machine requiring single operatives that a single pair of hand starting valves may be used but spaced so as to require the simultaneous push by both hands, or in another case where one operator is required on each side of the press a single hand starting valve or a pair of them may be used on each side of the machine as the circumstances require.

A hand stopping valve (either 81, 84, 85 or 86) as disclosed is located adjacent each hand starting valve (either 60, 62, 64 or 66) and as heretofore explained the pushing of only one of them is necessary to stop the machine. Their location is a matter of convenience and, of course, it is not essential that they be located adjacent the hand starting valves or that there be any particular number.

In normal operation of the press, the machine is started by the simultaneous pushing of the hand starting valves 60, 62, 64 and 66, and is stopped automatically at the end of a complete cycle of operation. The apparatus for automatically stopping the press is a cam actuated push button valve 87 which is similar to the hand starting valve 60 for instance, in that it is normally closed and is opened by the depressing of the valve stem 88. As shown in Fig. 1 the valve stem 88 is provided with a roller 89 arranged for actuation by the cam 90 mounted on the crankshaft 95. Thus as the crankshaft rotates, at the end of a complete cycle of operation, its high point 96 engages with the roller 89 and depresses the valve stem 88 to open a passage in the valve 87 to compressed air from the source through the conduits 48, 49 and 97 to the conduits 98, 99, 100 and 83 to the piston valve 34. The admission of compressed air to the piston valve 34 operates it as heretofore explained to exhaust one end of the distributing valve through the conduit 52 to stop the press. In order to require the operators to keep their hands on the hand starting valves during the time in which the press is lowering, the cam 90 has a high or safety portion 94. Thus if one or more hand starting valves are closed the high portion 94 will actuate the valve 87 to stop the press. The portion 94 is slightly spaced from the high point 96 and extends substantially along that part of the cam 90 that is opposite the roller 89 during the lowering of the press.

In the event that the momentum of the press is not sufficient to carry the high point 96 of the cam 90 past the roller 89 but stops engaging the roller 89 and depressing the valve stem 88, a hand open valve 101 is provided which is normally open and is inserted between the conduits 98 and 99 from cam actuated valve 87. The hand open push valve 101 is disclosed more fully in Fig. 6. It is provided with a body 102 in which is reciprocably mounted a valve stem 103 having a valve 104 arranged to be moved into engagement with the seat 105. A spring 110 resiliently keeps the valve 104 from its seat 105. A button 111 is mounted on the free end of the valve stem 103. As the button 111 is depressed the valve 104 is moved into engagement with the seat 105 and prevents the passage of compressed air from the conduit 98 to the conduit 99. Thus when the hand open valve 101 is depressed the supply of compressed air to the piston valve 34 is cut off even though the cam stop valve 87 is held open. The stopping end of the distributing valve 6 then can not exhaust through the conduit 52 and the piston valve 34 and the distributing valve 6 may be actuated to start the press.

In order to move the high point 96 of the cam 90 from the roller 89, it is necessary to slightly rotate the crankshaft 95. This is accomplished by closing the hand open valve 101 and at the same time operating the distributing valve 6 to start the press and then to stop it immediately. This operation is known as inching and is accomplished by means of the inching valve 112 which is shown generally in Fig. 1 and in detail in Fig. 7. The inching valve 112 is provided with an outlet port 113 opening to the atmosphere. The inching valve 112 is provided with an inlet port 115 and an inlet port 116. The inlet port 115 normally communicates directly with the outlet port 113 whereas the inlet port 116 is normally cut off from the outlet port 113 by a valve 117 seating on a seat 118. The valve 117 is urged against the seat 118 by a spring 119. To the outer end of the valve stem 120 is secured a button 121 which when depressed urges the valve 117 into engagement with the seat 122 to close the communication between the inlet port 115 and the outlet port 113 and to open a communication between the inlet port 116 and the outlet port 113.

Referring to Fig. 1 it will be observed that a conduit 123 connects the exhausting conduit 52 from the stopping side of the distributing valve 6 to the inlet port 115 of the inching valve 112 and that a petcock 114 in the conduit 123 controls the passage of air therethrough. Therefore, when the petcock 114 is opened the stopping side of the distributing valve 6 is exhausted to the atmosphere through the outlet port 113. By depressing the button 121 the communication from the exhausting side of the distributing valve 6 is closed and a communication between the conduit 47 from the starting side of the distributing valve 6 and the atmosphere by way of the outlet port 113 is established through a conduit 124 which connects with the inlet port 116 of the inching valve 112. A second petcock 109 in the conduit 124 controls the passage of air therethrough.

Under any conditions, if it is desired to turn the crankshaft of the press a slight amount it is merely necessary to open the normally closed petcocks 109 and 114 and to press the push button inching valve 112 either once for a period of time sufficiently long to obtain the desired movements of the crankshaft 95 or in a series of short inching movements. When it is desired to move the high point 96 of the cam 90 from contact with the roller 89 when it has stopped in that position, it is merely necessary to close the hand open valve 101 to permit starting of the machine and to inch the cam shaft 95 forwardly by means of the push button inching valve 112, until the high point 96 has passed the roller 89.

As an added safety feature the system is provided with a low pressure stop valve 130 disclosed generally in Fig. 8 and in detail in Fig. 9. The purpose of the low pressure stop valve is to release the clutch when the pressure from the source becomes too low. As shown in Fig. 9 the low pressure stop valve 130 comprises a frame 131 in which is disposed a diaphragm 132 having its underside in constant communication with the source of compressed air through the conduits 48, 49 and 133 and the inlet port 134. The pressure exerted against the underside of the diaphragm 132 is counteracted by a spring 135 bearing at one end against a plate 136 in contact with an adjusting nut 137 and at the other end against a plate 138 in contact with the top of the diaphragm 132.

A stem 139 is connected to the diaphragm 132 and slidably mounted in the adjusting nut 137. The stem 139 will then take a vertical position depending upon the balance of forces exerted by the spring 135 and the pressure on the underside of the diaphragm 132 and the position of the stem 139 may be fixed for a given pressure on the underside of the diaphragm 132 by adjustment of the nut 137. The purpose of the pressure responsive stem 139 is to control the operation of the exhaust push button valve 145 which is similar in construction to the hand starting valve 60 illustrated in Fig. 5 except that the button 73 of the valve 60 is replaced by a flattened knob 146. The inlet 147 of the exhaust valve 145 is connected by a conduit 148 to the conduit 123 which in turn communicates with the exhausting conduit 52 communicating with the stopping end of the distributing valve 6.

Movement of the stem 139 is transferred to the knob 146 by an arm 149 pivoted between its ends to the stem 139 and at one of its ends to a fixed bracket 150. The free end of the arm 149 is provided with an adjustable pin 151 for contacting engagement with the knob 146. It will thus be evident that when the pressure of the compressed air supply drops to a predetermined low value, the spring 135 will act to drive the stem 139 downwardly which in turn will move the pin 151, by means of the arm 149, downwardly to depress the knob 146. The depressing of the knob 146 will open the valve 145 and exhaust the stopping end of the distributing valve 6 through the conduits 52, 123 and 148, through the valve 145 and its outlet 152 to the atmosphere.

It will be clear from the foregoing description that our improved safety control system may take various forms and may be carried out with other equivalent types of valve equipment than that herein disclosed. It will be further obvious that by use of the present invention machines may be not only operated semiautomatically as disclosed but may be operated fully manually by closing the hand valve 101 by means of the hold down cap 155, or may be arranged to operate entirely automatically. In its simplest form the system may comprise a single stopping and a single starting button as disclosed in the aforementioned copending application of Oscar G. Tweddell, Serial No. 733,617, filed July 3, 1934.

It will further be evident that instead of admitting compressed air to the piston valves 34 and 35 to exhaust the stopping and starting ends of the distributing valve 6, the starting and stopping ends of the distributing valve 6 may be exhausted directly by the starting and stopping push button valves. It has been found in practice that when the distributing valve 6 is more than fifteen feet from a starting or stopping push button valve that the "pressure type" system should be used, that is, the system disclosed, wherein compressed air is utilized for operating the piston exhausting valves. Further it will be understood that the present invention is not limited to application on stamping presses but may be used for a wide variety of machines.

Having thus described our invention what we desire to protect by Letters Patent and claim is:

1. A system of the character described comprising mechanism to start and stop a machine, means including a plurality of manually operable means to operate said mechanism for starting the machine, connections between said means and said mechanism requiring simultaneous operation of said manually operable means to operate said mechanism for starting said mechanism, means including a plurality of manually operable means to operate said mechanism for stopping the machine, and connections between said last named means and said mechanism requiring the operation of only one of said named manually operable means to operate said mechanism for stopping said machine.

2. A system of the character described comprising a piston to start and stop a machine, a cylinder in which said piston is operated, a distributing valve to direct compressed air to one end of said cylinder to stop the machine and to the other end of the cylinder to start the machine, a plurality of air valves for operating said distributing valve to move said piston to start the machine, pneumatic connections between said air valves and said distributing valve requiring simultaneous operation of said air valves to operate said distributing valve, and means to operate said distributing valve to move said piston to stop the machine.

3. A system of the character described comprising a piston to start and stop a machine, a cylinder in which said piston is operated, a distributing valve to direct compressed air to one end of said cylinder to stop the machine and to the other end of the cylinder to start the machine, a plurality of air valves for operating said distributing valve to move said piston to start the machine, pneumatic connections between said air valves and said distributing valve requiring simultaneous operation of said air valves to operate said distributing valve, a plurality of air valves for operating said distributing valve to move said piston to stop the machine and connections between said last named air valves and said distributing valve requiring the operation of only one of said last named air valves to operate said distributing valve to move said piston to stop the machine.

4. A system of the character described comprising a piston to start and stop a machine, a cylinder in which said piston is operated, a distributing valve to direct compressed air to one end of said cylinder to stop the machine and to the other end of the cylinder to start the machine, a plurality of air valves at spaced stations for operating said distributing valve to move said piston to start the machine, pneumatic connections between said air valves and said distributing valve requiring simultaneous operation of said air valves to operate said distributing valve, and means to operate said distributing valve to move said piston to stop the machine.

5. A system of the character described comprising a piston to start and stop a machine, a cylinder in which said piston is operated, a distributing valve to direct compressed air to one end of said cylinder to stop the machine and to the other end of the cylinder to start the machine, a plurality of air valves at spaced stations for operating said distributing valve to move said piston to start the machine, pneumatic connections between said air valves and said distributing valve requiring simultaneous operation of said air valves to operate said distributing valve, means to operate said distributing valve to move said piston to stop the machine, and automatic means to operate said distributing valve to move said piston to stop the machine.

6. A system of the character described comprising mechanism to start and stop the operation of a machine, means including a plurality of manually operable means to operate said mechanism for starting the machine, connections between said means and said mechanism requiring simultaneous operation of said manually operable means to operate said mechanism for starting the machine, means including a plurality of manually operable means to operate said mechanism for stopping the machine, and connections between said last named means and said mechanism requiring the operation of only one of said last named manually operable means to operate said mechanism for stopping the machine, said first named and second named manually operable means being equal in number, there being a first named manually operable means by each second named operable means, said first named manually operable means being spaced one from the other sufficiently to prevent the simultaneous operation of any two of them by one hand.

7. A system of the character described comprising mechanism to start and stop a machine, means including a plurality of manually operable means to operate said mechanism for starting the machine, connections between said means and said mechanism requiring simultaneous operation of said manually operable means to operate said mechanism for starting said mechanism, means including a plurality of manually operable means to operate said mechanism for stopping the machine at any time during the cycle of operation thereof, and connections between said last named means and said mechanism requiring the operation of only one of said named manually operable means to operate said mechanism for stopping said machine.

8. A system of the character described comprising mechanism to start and stop the operation of a machine, means including a plurality of manually operable means to operate said mechanism for starting the machine, connections between said means and said mechanism requiring simultaneous operation of said manually operable means to operate said mechanism for starting the machine, means including a plurality of manually operable means to operate said mechanism for stopping the machine at any time during the cycle of operation thereof, and connections between said last named means and said mechanism requiring the operation of only one of said last named manually operable means to operate said mechanism for stopping the machine, said first named and second named manually operable means being equal in number, there being a first named manually operable means by each second named operable means, said first named manually operable means being spaced one from the other sufficiently to prevent the simultaneous operation of any two of them by one hand.

9. A system of the character described comprising mechanism to start and stop the operation of a machine, means including a plurality of manually operable means to operate said mechanism for starting the machine, connections between said means and said mechanism requiring simultaneous operation of said manually operable means to operate said mechanism for starting the machine, automatic means to operate said mechanism to stop the machine, said automatic means comprising a cam driven by the machine and means actuated by said cam, and manually controlled means to operate said mechanism to actuate the machine in relatively short periods of manually determined length at any time during the cycle of operation thereof.

HAROLD A. TOMKINS.
LOYD A. WARD.